United States Patent [19]

Peters

[11] 4,454,511
[45] Jun. 12, 1984

[54] PULSE DOPPLER RADAR WITH FIXED TARGET ECHO REJECTION CIRCUIT FORMED OF RECURSION FILTERS

[75] Inventor: Rainer Peters, Unterhaching, Fed. Rep. of Germany

[73] Assignee: Siemens Aktiengesellschaft, Berlin & Munich, Fed. Rep. of Germany

[21] Appl. No.: 294,575

[22] Filed: Aug. 20, 1981

[30] Foreign Application Priority Data

Sep. 4, 1980 [DE] Fed. Rep. of Germany ....... 3033382

[51] Int. Cl.³ .............................................. G01S 13/50
[52] U.S. Cl. .............................. 343/7.7; 343/17.1 PF
[58] Field of Search ............. 343/5 FT, 7.7, 17.1 PF, 343/7 A; 364/745, 724; 375/14, 88, 104, 118, 110; 367/97

[56] References Cited

U.S. PATENT DOCUMENTS

| | | | |
|---|---|---|---|
| 3,925,614 | 12/1975 | Bousmar | 375/88 |
| 4,034,196 | 7/1977 | Butterweck et al. | 364/745 |
| 4,093,949 | 6/1978 | Evans | 343/7.7 X |
| 4,117,538 | 9/1978 | Shrader et al. | 343/7.7 X |

Primary Examiner—S. C. Buczinski
Assistant Examiner—K. R. Kaiser
Attorney, Agent, or Firm—Hill, Van Santen, Steadman & Simpson

[57] ABSTRACT

A fixed target echo rejection circuit in a pulse Doppler radar device which uses recursion filters and which have a return loop with the feedback signal passing through a weighting multiplier. The weighting function of the recursion signal occurs when a change of the pulse repetition frequency (PRF) occurs by switching and changing the weighting factors. So as to reduce spurious signals which would occur during switching, the weighting factor switching is delayed and carried when the recursion signal passes through a zero value so as to substantially reduce the spurious signals.

9 Claims, 4 Drawing Figures

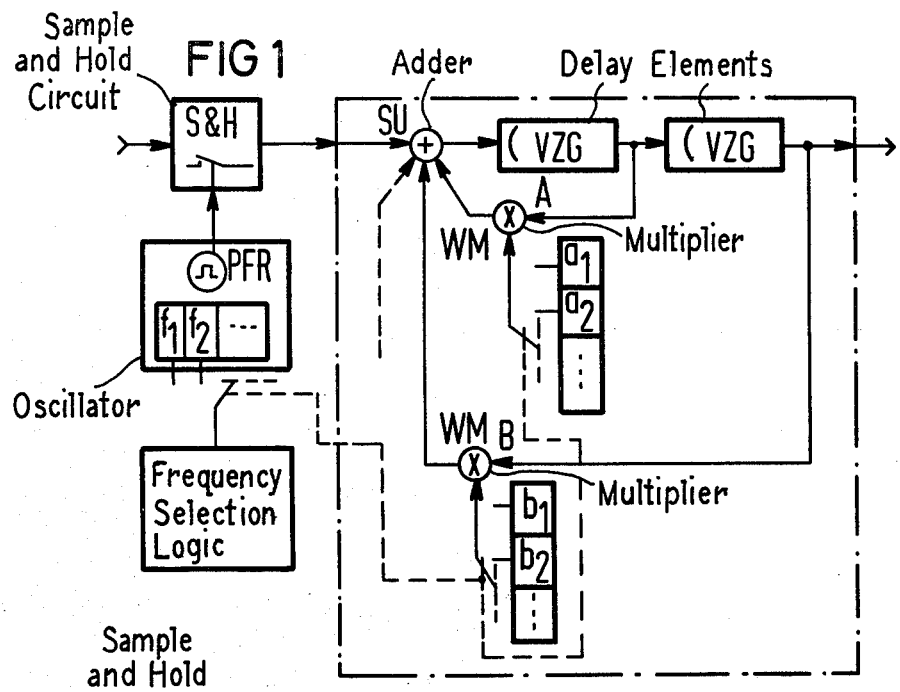
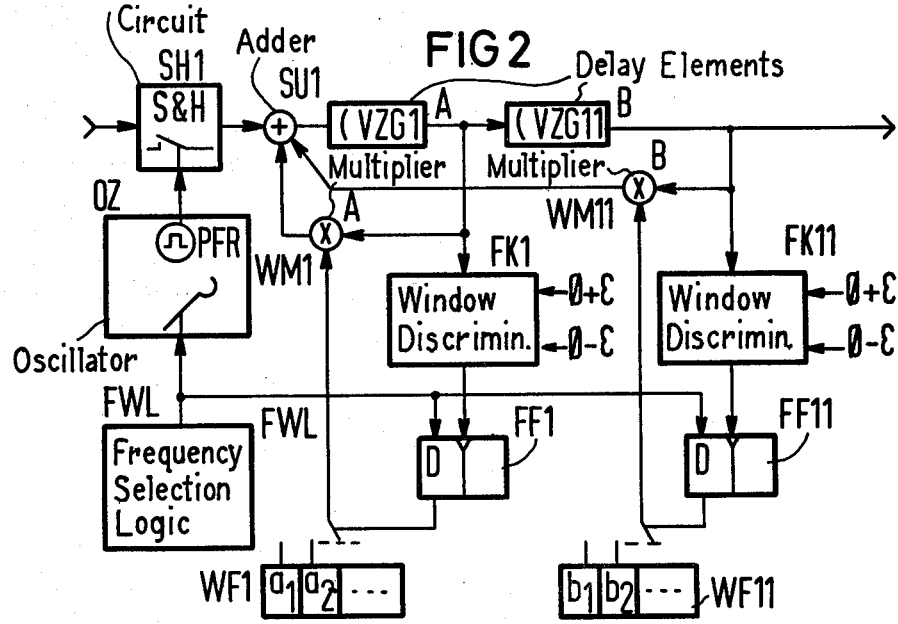

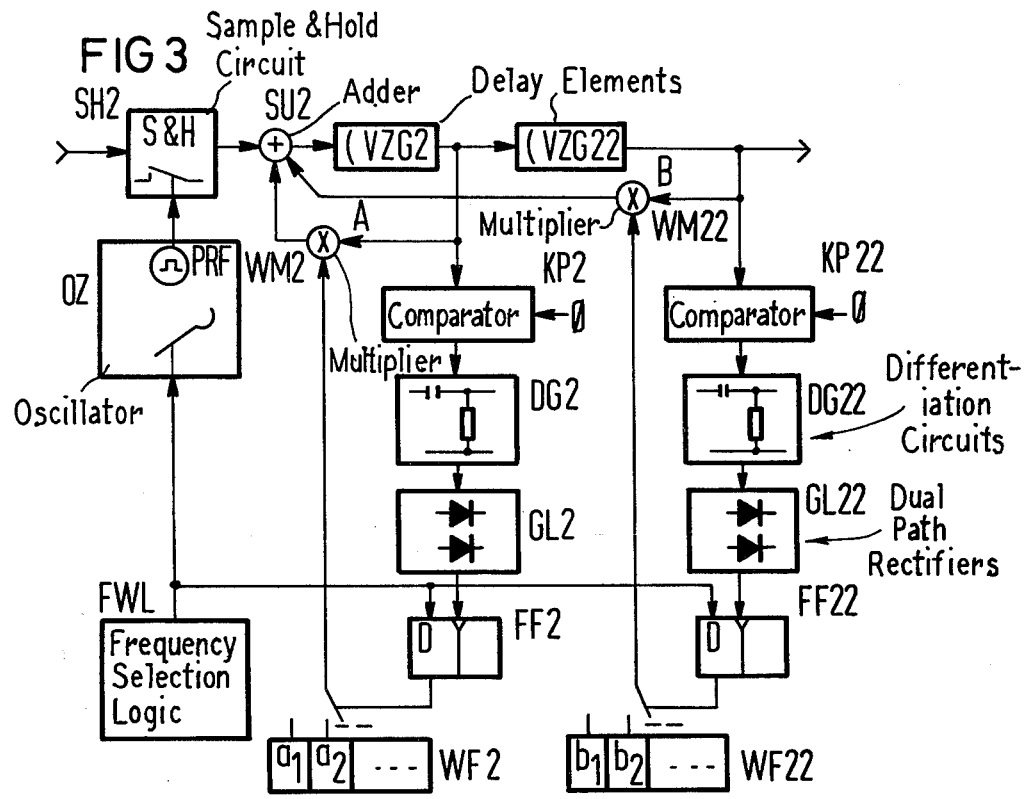

PULSE DOPPLER RADAR WITH FIXED TARGET ECHO REJECTION CIRCUIT FORMED OF RECURSION FILTERS

BACKGROUND OF THE INVENTION

2. Field of the Invention

This invention relates in general to a pulse Doppler radar system with a range gate circuit and with a fixed target echo rejection circuit consisting of recursion filters with at least one delay element wherein a return loop is connected across the delay element and weighting changes of the recursion signal occur upon a change of the pulse repetition frequency (PRF) by switching weighting factors to a weighting multiplier.

2. Description of the Prior Art

When the changeover of the pulse repetition frequency occurs in radar devices, significant effects on signal processing occurs, as for example, in the suppression of fixed target echoes in the fixed target echo rejection circuit (MTI filter). The scanning filters of a fixed target echo rejection circuit form a transmission quadripole. If despite variation of scanning rates in the time domain specific transmission properties are to remain constant for example, the unstandardized lower cutoff frequency, the transmission behaviour corresponding to the scanning rate must be changed. When recursive scanning filters are used, this means that the weighting factors in the individual recursions must be varied according to the respective scanning rate. This causes a change of the standardized transmission characteristics. The transmission properties of the quadripole causes a specific transient response to such changes of the pulse repetition frequency.

FIG. 1 illustrates a known doubly recursive MTI filter with switchable weighting factors. The input signals of the recursive filter are supplied to a sample and hold circuit SH and are then supplied through a summing circuit SU to two series connected delay elements, VZG and VZG each of which are provided with a return loop. A first weighting amplifier WM is inserted in the return for the first delay element and is labelled channel A and weighting signals a1, a2 . . . are supplied to the weighting amplifier in channel A and the output is supplied to the summing circuit SU. A second channel B receives the output of the second delay element VZG and supplies its input to a weighting multiplier WM which also receives weighting factors b1, b2 . . . and channel B supplies its ouput to the summing circuit SU. The changeover of the weighting factors a and b occur as a function of the frequency selection of the radar pulses and thus these changeovers are made by the frequency selector circuit which also changes the pulse repetition frequency to the sample and hold circuit. The effect of the changeover of the weighting factors can be mathematically reproduced by means of an equivalent step function wherein the input signal function is additively changed. The amplitude of the step is calculated at $$\text{step} = (a_{84} - a_\mu) \cdot A + (b_{84} - b_\mu) \cdot B + (c_v - c_\mu) \cdot C + \ldots$$

Upon occurrence of such a step at the input of the recursive filter, transient processes occur of the output magnitude, size, duration and spectral components of the transient depending on the amplitude of the step and on the transfer characteristics of the recursive filter. Spectral components which were not present in the input signal are generated for a specific time and fall with high probability into frequency ranges in radar devices which could be moving targets. Such spurious signals result in false alarms in radar devices for the duration of their occurrence.

Such disturbant influences can be avoided by interrupting the signal flow at the output of the recursion filter for the time duration of the transient process. A solution in this manner, however, has the disadvantage that useful signals resulting from the moving target echoes occurring during this time would be lost.

SUMMARY OF THE INVENTION

The equation for the step function demands that the size of the disruptive step depends on the difference of the weighting factors and on the size of the recursion signals A, B, C . . . at the signal inputs of the weighting multiplier WM and since the weighting factors determine the transfer characteristics, of the recursion filter there is no possibility of this portion of the circuit being changed.

It is an object of the present invention to reduce the disturbances occurring in a recursion filter due to the switching of the weighting factors in a pulse Doppler radar of the type described above.

Due to the fact that the recursion signals A, B, C . . . at the input of the weighting multiplier have a time periodicity without dc voltage component or consist of zero-symmetrical noise and that they can assume any value within their zero-symmetrical maximum values at the time the pulse repetition frequency is switched, the step function is maintained very small according to the invention as the changeover of the weighting factors for each pulse repetition frequency occurs are delayed after a change of the pulse repetition frequency at the time at which the recursion signal returning from the output of the delay line passes through zero. In this way spurious signals will be suppressed and eliminated.

The spurious signals occurring at the changeover of the pulse repetition frequency due to the transient processes at the filter outputs will be largely cancelled at Doppler frequencies in the proximity of the fixed target-echo spectrum due to the delayed weighting factor utilization. Using Doppler frequencies in the range of moving targets, spurious signals are only slightly reduced. Here, however, false alarms are prevented since the useful signals mask the spurious signals in such cases.

The delayed changeover of the weighting factor can be utilized with either analog or digital design of the signal processing equipment using simple or multiple recursive filters.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 illustrates a recursive MTI filter according to the prior art;

FIG. 2 illustrates an analog recursive MTI filter according to the invention using a zero detector;

FIG. 3 illustrates a modification of the invention using an analog doubly recursive MTI filter using a comparator circuit; and FIG. 4 is a further modification of the invention illustrating a digital double recursive MTI filter.

DESCRIPTION OF THE PREFERRED EMBODIMENTS

Three various modifications of the invention will be described and in all of these embodiments the weighting circuits include multipliers which receive two inputs from the feedback from the delay lines and the weighting inputs to form the signal that is to be combined in the adding circuits. The recursion signals of the associated delay element is applied to the weighting multiplier as well as the weighting factor which is supplied to the weighting input. As distinguished from the prior art circuit illustrated in FIG. 1, the weighting factors in the present invention are not synchronously switched with the pulse repetition frequency. At each zero passage of the signal input of the multiplier of each weighting circuit, an identification for the respectively existing pulse repetition frequency is determined. The switching over or switching on of the pulse repetition frequency occurs according to its own criteria. As a function of the interrogated identification information, the weighting factor associated with the respective pulse repetition frequency is switched at the weighting input of the weighting multiplier.

In the sample embodiment illustrated in FIG. 2, the echo signals are supplied to the sample-and-hold circuit SH1 to the recursive filter which includes a summing circuit SU1. The switching of the sample-and-hold circuit SH1 occurs as a function of the pulse repetition frequency which is generated by a switchable oscillator OZ under the control of a frequency selection logic circuit FWL. A first delay circuit VZG1 is connected to the output of the summing circuit SU1 and supplies an input to a second delay element VZG11. A recursion signal A is produced at the output of the delay element VZG1 which is applied to a weighting multiplier WM1 which also receives a weighting factor signal a1, a2 . . . from a weighting multiplier generator WF1. The output of the weighting multiplier WM1 is applied to the input of the summing circuit SU1. The output of the second delay element VZG11 is supplied to a weighting multiplier WM11 which receives a weighting multiplier input b1, b2 . . . from a weighting factor generator WF11 and the output of the weighting multiplier WM11 is supplied to the summing circuit SU1. In order to be able to switch the weighting factor when the associated recursion signal passes through zero value, a zero detector such a window discriminator which has window limits with the thresholds of $\phi-\epsilon$ and $\phi+\epsilon$ a first window discriminator FK1 receives the output of the delay element VZG1 and when the output of the zero detector FK1 identifies a zero crossing it supplies an output to a D-flip-flop FF1 which is connected to the switching control of the weighting multiplier WF1. The flip-flop FF1 also receives an input from the frequency selector logic FWL. A second window discriminator FK11 receives the output of the second delay line VZG11 and supplies an input to a second D-flip-flop FF11 which controls the switchig of the weighting multiplier factor from the generator WF11. The flip-flop FF11 also receives an input FWL from the frequency selector logic generator.

FIG. 3 illustrates a modification of the invention illustrated in FIG. 2 wherein the window discriminators FK1 and FK11 have each been replaced by a series connection of a different circuit for determining when the zero crossing of the recursion signals occur. In this case, the output of the delay line VZG2 is supplied to a comparator KP2 which supplies an output to a differentiating circuit DG2 which in turn supplies an output to a double path rectifier circuit GL2 which supplies an input to the flip-flop FF2. A double path rectifier comprises a full wave rectifier. Similarly, a second comparator KP22 receives the output of the delay circuit VZG 22 and supplies an input to a differentiating circuit DG22 which supplies an input to a double path rectifier circuit GL22 that in turn supplies an input to a flip-flop FF22. Thus, the circuit of FIG. 3 operates in the same manner as FIG. 2 except the manner of detecting the zero crossing of the recursive signal is different in the two circuits.

FIG. 4 illustrates the invention constructed with digital circuitry and logic. For detecting the zero crossing of the recursive signals, the output of the first delay line VZG3 as well as its input are supplied to the inputs of an exclusive OR gate OG3. The output of the OR gate OG3 is supplied as an input to the flip-flop FF3 which controls the weighting function a1, a2 . . . A second exclusive OR gate OG33 is connected across the input and output of the second delay element VZG33 and supplies an input to the flip-flop FF33 which controls the weighting function b1, b2 . . . In the circuit of FIG. 4, the passage of the recursion signals through zero results in operational sign changes of the digital signals before and after each delay elements, respectively, and when different operational signs exist at the input and output of the respective elements VZG3 and VZG33 then the gate outputs will supply a logical 1. As in the embodiments previously described, this is used to interrogate the identification with the D-flip-flops FF3 and FF33 respectively to determine which pulse repetition frequency is presently turned on and to then select the proper weighting factor.

Different operational signs before and after the delay elements indicate that a zero passage of the recursion voltage will occur at the output of the delay element at the next signal sampling which occurs at the filter input.

All the circuits described in the invention can also be utilized in time division multiplex operation with separate range channel processing. For this purpose, the allocation of the weighting factor must be separately undertaken and stored for each range channel.

Although the invention has been described with respect to preferred embodiments, it is not to be so limited as changes and modifications can be made which are within the full intended scope of the invention as defined by the appended claims.

I claim as my invention:

1. A pulse Doppler radar with a range gate circuit and with a fixed target echo rejection circuit, consisting of recursion filters with at least one delay element which has a return loop wherein weighting of the recursion signals occurs and upon a change of the pulse repetition frequency (PRF) the weighting factors are changed by means of a weighting multiplier, characterized in that the switching of the weighting factors (a, b, c . . . ) corresponding to each pulse repetition frequency occurs at a delayed time after a change of the pulse repetition frequency at the time at which the recursion signal (A, B, C . . . ) which is returned from the output of the delay line passes through zero.

2. A pulse Doppler radar with a range gate circuit and with a fixed target echo rejection circuit, consisting of recursion filters with at least one delay element which has a return loop wherein weighting of the recursion signals occurs and upon a change of the pulse repetition frequency (PRF) the weighting factors are changed by means of a weighting multiplier, characterized in that the switching of the weighting factors (a, b, c . . . ) corresponding to each pulse repetition frequency occurs at a delayed time after a change of the pulse repetition frequency at the time at which the recursion signal (A, B, C . . . ) which is returned from the output of the delay line passes through zero, and characterized in that the delayed switching of the weighting factor for a recursion filter constructed in analog technology occurs by using a zero detector (window discriminator) in conjunction with a D-flip-flop, and said zero detector being connected to the signal input of the weighting multiplier (WM).

3. A pulse Doppler radar with a range gate circuit and with a fixed target echo rejection circuit, consisting of recursion filters with at least one delay element which has a return loop wherein weighting of the recursion signals occurs and upon a change of the pulse repetition frequency (PRF) the weighting factors are changed by means of a weighting multiplier, characterized in that the switching of the weighting factors (a, b, c . . . ) corresponding to each pulse repetition frequency occurs at a delayed time after a change of the pulse repetition frequency at the time at which the recursion signal (A, B, C . . . ) which is returned from the output of the delay line passes through zero, characterized in that the delayed switching of the weighting factor for an analog recursion filter occurs by using employment of a zero comparator connected to the signal output of the weighting multiplier (WM), and said zero comparator being connected to a D-flip-flip through a differentiation circuit and a double path rectifier circuit.

4. A pulse Doppler radar with a range gate circuit and with a fixed target echo rejection circuit, consisting of recursion filters with at least one delay element which has a return loop wherein weighting of the recursion signals occurs and upon a change of the pulse repetition frequency (PRF) the weighting factors are changed by means of a weighting multiplier, characterized in that the switching of the weighting factors (a, b, c . . . ) corresponding to each pulse repetition frequency occurs at a delayed time after a change of the pulse repetition frequency at the time at which the recursion signal (A, B, C . . . ) which is returned from the output of the delay line passes through zero, and characterized in that the delayed switching of the weighting factor switching with a digital recursion filter, the operational sign of the digital signals at the input and output of each delay element (shift register) are monitored by an exclusion OR gate and are evaluated in conjunction with a D-flip-flop.

5. A pulse Doppler radar with a range gate circuit and a fixed target echo rejection circuit comprising a sample-and-hold circuit which receives an input signal, a variable pulse repetition frequency oscillator supplying an input to said sample-and-hold circuit, a frequency selector logic circuit connected to said pulse repetition frequency oscillator, a summing circuit receiving the output of said sample-and-hold circuit, a first delay element receiving the output of said summing circuit, a zero crossing detector connected to the output of said first delay element, a first flip-flop circuit receiving inputs from said zero crossing detector and said frequency selector logic circuit, a first source of weighting multiplier factors and said first flip-flop circuit connected to control the output weighting factor, and a first weighting multiplier receiving the outputs of said first delay element and said first source of weighting multiplier factors and supplying an output to said summing circuit.

6. A pulse Doppler radar according to claim 5 wherein said zero crossing detector comprises a window discriminator.

7. A pulse Doppler radar according to claim 5 wherein said zero crossing detector comprises, a comparator, a differentiator connected to the output of said comparator and a dual path rectifier connected to the output of said differentiator.

8. A pulse Doppler radar according to claim 5 wherein said zero crossing detector comprises an exclusive OR gate connected across the input and output of said first delay element and supplying an input to said first flip-flop circuit.

9. A pulse Doppler radar according to claim 5 including a second delay element connected to the output of said first delay element, a second zero crossing detector connected to the output of said second delay element, a second flip-flop receiving inputs from said second zero crossing detector and said frequency selector logic circuit, a second source of weighting multiplier factors and said second flip-flop connected to control the output weighting factor, a second weighting multiplier receiving the outputs of said second delay element and said second source of weighting factors and supplying an output to said summing circuit.

* * * * *